United States Patent
Clark (10) Patent No.: US 10,579,536 B2
(45) Date of Patent: Mar. 3, 2020

(54) MULTI-MODE RADIATION HARDENED MULTI-CORE MICROPROCESSORS

(71) Applicant: Lawrence T. Clark, Phoenix, AZ (US)

(72) Inventor: Lawrence T. Clark, Phoenix, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 487 days.

(21) Appl. No.: 15/672,810

(22) Filed: Aug. 9, 2017

(65) Prior Publication Data

US 2018/0046580 A1  Feb. 15, 2018

Related U.S. Application Data (60) Provisional application No. 62/372,542, filed on Aug. 9, 2016.

(51) Int. Cl.
*G06F 12/0897* (2016.01)

(52) U.S. Cl.
CPC .. *G06F 12/0897* (2013.01); *G06F 2212/1032* (2013.01); *G06F 2212/608* (2013.01)

(58) Field of Classification Search
CPC .......... G06F 11/00; G06F 11/07; G06F 11/08; G06F 11/14; G06F 11/18; H03K 19/003;
(Continued)

(56) References Cited

U.S. PATENT DOCUMENTS

| | | |
|---|---|---|
| 4,621,201 A | 11/1986 | Amdahl et al. |
| 4,897,814 A | 1/1990 | Clark |

(Continued)

FOREIGN PATENT DOCUMENTS

| | | |
|---|---|---|
| WO | 8912300 A1 | 12/1989 |
| WO | 2009085363 A2 | 7/2009 |

(Continued)

OTHER PUBLICATIONS

Anelli, G. et al., "Radiation tolerant VLSI circuits in standard deep submicron CMOS technologies for the LHC experiments: practical design aspects," IEEE Transactions on Nuclear Science, vol. 46, Issue 6, Dec. 1999, pp. 1690-1696.

(Continued)

*Primary Examiner* — Jason Crawford
(74) *Attorney, Agent, or Firm* — Withrow & Terranova, P.L.L.C.

(57) ABSTRACT

Systems and methods for multi-mode radiation hardened multi-core microprocessors are disclosed. In some embodiments, a triplicated circuit includes a first core logic, a second core logic, a third core logic, and bus arbitration and control circuitry. The triplicated circuit is configurable to operate in both a Triple-Modular Redundant (TMR) mode of operation and a multi-threaded mode of operation. In some embodiments, there is essentially no overhead in soft mode and low overhead (power only) in hard mode. In most applications, it is expected that portions of missions require very hard systems (e.g., landing) where a failure is catastrophic. However, other portions require essentially no hardening (digital signal processor and signal processing activities) but much better throughput. Consequently, there is a huge opportunity to develop computer processors with low overhead in soft mode and unprecedented hardness in hard mode.

18 Claims, 9 Drawing Sheets

(58) Field of Classification Search
CPC ......... H03K 19/0033; H03K 19/00392; H03K 19/007; H03K 19/0075; H03K 17/08; H03K 17/0803

See application file for complete search history.

(56) References Cited

U.S. PATENT DOCUMENTS

| | | | |
|---|---|---|---|
| 5,883,814 A | 3/1999 | Luk et al. | |
| 6,104,211 A | 8/2000 | Alfke | |
| 6,127,864 A | 10/2000 | Mavis et al. | |
| 6,499,048 B1* | 12/2002 | Williams | G06F 9/52 718/102 |
| 6,526,559 B2 | 2/2003 | Schiefele et al. | |
| 6,646,464 B2 | 11/2003 | Maruyama | |
| 6,898,770 B2 | 5/2005 | Boluki et al. | |
| 7,138,442 B2 | 11/2006 | Smith et al. | |
| 7,212,448 B1 | 5/2007 | Trimberger | |
| 7,310,759 B1* | 12/2007 | Carmichael | G06F 11/1004 714/725 |
| 7,321,989 B2 | 1/2008 | Grayver | |
| 7,404,161 B2 | 7/2008 | Dutt et al. | |
| 7,541,832 B1 | 6/2009 | Clark et al. | |
| 7,649,216 B1 | 1/2010 | Clark et al. | |
| 7,719,304 B1 | 5/2010 | Clark et al. | |
| 7,859,292 B1* | 12/2010 | Shuler, Jr. | H03K 19/0033 326/11 |
| 7,904,772 B2 | 3/2011 | Nicolaidis | |
| 7,920,409 B1 | 4/2011 | Clark et al. | |
| 7,920,410 B1 | 4/2011 | Lee et al. | |
| 8,015,533 B1 | 9/2011 | Burstein et al. | |
| 8,122,317 B1 | 2/2012 | Clark et al. | |
| 8,161,367 B2 | 4/2012 | Chandra | |
| 8,397,130 B2 | 3/2013 | Clark et al. | |
| 8,397,133 B2 | 3/2013 | Clark et al. | |
| 8,462,565 B2 | 6/2013 | Venugopal et al. | |
| 8,488,370 B2 | 7/2013 | Venugopal et al. | |
| 8,489,919 B2 | 7/2013 | Clark et al. | |
| 8,493,120 B2 | 7/2013 | Choudhury et al. | |
| 8,495,548 B2 | 7/2013 | Agarwal et al. | |
| 8,717,793 B2 | 5/2014 | Maurya et al. | |
| 8,729,923 B2 | 5/2014 | Ramachandra | |
| 8,767,445 B2 | 7/2014 | Chellappa et al. | |
| 8,787,086 B1 | 7/2014 | Clark et al. | |
| 8,791,718 B2 | 7/2014 | Clark et al. | |
| 8,860,197 B2 | 10/2014 | Clark et al. | |
| 8,860,575 B2 | 10/2014 | Allee et al. | |
| 8,863,064 B1 | 10/2014 | Tien et al. | |
| 8,966,329 B2 | 2/2015 | Clark et al. | |
| 9,038,012 B2 | 5/2015 | Clark et al. | |
| 9,041,429 B2 | 5/2015 | Clark | |
| 9,054,688 B2 | 6/2015 | Clark et al. | |
| 9,159,421 B2 | 10/2015 | Maurya et al. | |
| 9,191,009 B1 | 11/2015 | Clark et al. | |
| 9,467,144 B2 | 10/2016 | Clark | |
| 9,734,272 B2 | 8/2017 | Clark et al. | |
| 9,740,494 B2 | 8/2017 | Clark et al. | |
| 9,780,788 B2* | 10/2017 | Clark | H03K 19/00392 |
| 10,078,494 B2 | 9/2018 | Clark et al. | |
| 2005/0246587 A1* | 11/2005 | Bernick | G06F 9/52 714/38.13 |
| 2006/0050550 A1* | 3/2006 | Petersen | G11C 11/4125 365/154 |
| 2006/0150186 A1* | 7/2006 | Grayver | G06F 11/1494 718/102 |
| 2006/0220700 A1 | 10/2006 | Hoover et al. | |
| 2007/0277137 A1 | 11/2007 | Savithri et al. | |
| 2008/0082893 A1* | 4/2008 | Wang | G06F 11/1008 714/758 |
| 2009/0184733 A1 | 7/2009 | Lilja | |
| 2009/0204933 A1 | 8/2009 | Rezgui | |
| 2011/0208997 A1* | 8/2011 | Czajkowski | G06F 11/1497 714/10 |
| 2012/0180005 A1 | 7/2012 | Lilja | |
| 2012/0306535 A1 | 12/2012 | Clark et al. | |
| 2014/0049286 A1* | 2/2014 | Clark | H03K 19/0033 326/16 |
| 2014/0077854 A1 | 3/2014 | Clark et al. | |
| 2014/0143635 A1* | 5/2014 | Gandhi | G06F 11/10 714/766 |
| 2015/0081267 A1* | 3/2015 | Conroy | G06F 9/455 703/21 |
| 2015/0363517 A1 | 12/2015 | Clark et al. | |
| 2016/0065243 A1 | 3/2016 | Patterson et al. | |
| 2017/0185465 A1* | 6/2017 | Ould-Ahmed-Vall | G06F 11/14 |

FOREIGN PATENT DOCUMENTS

| | | |
|---|---|---|
| WO | 2010011399 A2 | 1/2010 |
| WO | 2010042820 A1 | 4/2010 |
| WO | 2010042824 A1 | 4/2010 |
| WO | 2010104543 A2 | 9/2010 |
| WO | 2010138639 A2 | 12/2010 |
| WO | 2011022099 A2 | 2/2011 |
| WO | 2012012369 A2 | 1/2012 |

OTHER PUBLICATIONS

Author Unknown, "RTAX-S/SL and RTAX-DSP Radiation-Tolerant FPGAs," Microsemi Corporation, Revision 15, May 2012, www.actel.com/documents/RTAXS_DS.pdf, 278 pages.

Benedetto, J. et al., "Digital single event transient trends with technology node scaling," IEEE Transactions on Nuclear Science, vol. 53, Issue 6, Dec. 2006, pp. 3462-3465.

Benedetto, J. et al., "Heavy ion-induced digital single-event transients in deep submicron processes," IEEE Transactions on Nuclear Science, vol. 51, Issue 6, Dec. 2004, pp. 3480-3485.

Benini, L. et al., "A survey of design techniques for system-level dynamic power management," IEEE Transactions on Very Large Scale Integration (VLSI) Syst., vol. 8, Issue 3, Jun. 2000, pp. 299-316.

Biswas, Arijit, et al., "Computing Architectural Vulnerability Factors for Address-Based Structures," 32nd International Symposium on Computer Architecture, Jun. 2005, IEEE, 12 pages.

Braatz, James, et al., "ASIC Design System for Radiation Environments," Fourth Annual IEEE International ASIC Conference and Exhibit, Sep. 23-27, 1991, Rochester, New York, IEEE, 4 pages.

Cabanas-Holmen, Manuel, et al., "Predicting the Single-Event Error Rate of a Radiation Hardened by Design Microprocessor," IEEE Transactions on Nuclear Science, vol. 58, Issue 6, Dec. 2011, IEEE, pp. 2726-2733.

Calin, T., et al., "Upset Hardened Memory Design for Submicron Cmos Technology," IEEE Transactions on Nuclear Science, vol. 43, No. 6, Dec. 1996, pp. 2874-2878.

Chellappa, Srivatsan, et al., "Advanced Encryption System with Dynamic Pipeline Reconfiguration for Minimum Energy Operation," 16th International Symposium on Quality Electronic Design, Mar. 2-4, 2015, Santa Clara, California, IEEE, pp. 201-206.

Clark, Lawrence, et al., "A Dual Mode Redundant Approach for Microprocessor Soft Error Hardness," IEEE Transactions on Nuclear Science, vol. 58, Issue 6, Dec. 2011, IEEE, pp. 3018-3025.

Clark, Lawrence, et al., "An Embedded Microprocessor Radiation Hardened by Microarchitecture and Circuits," IEEE Transactions on Computers, vol. 65, No. 2, Apr. 2015, IEEE Computer Society, 14 pages.

Clark, Lawrence, et al., "Methodical Design Approaches to Radiation Effects Analysis and Mitigation in Flip-flop Circuits," IEEE Computer Society Annual Symposium on VLSI, Jul. 9-11, 2014, Tampa, Florida, IEEE, pp. 595-600.

Diehl, S.E. et al., "Considerations for single event immune VLSI logic," IEEE Transactions Nuclear Science, vol. 30, Issue 6, 1983, pp. 4501-4507.

Dodd, P. et al., "Production and propagation of single-event transients in high-speed digital logic ICs," IEEE Transactions on Nuclear Science, vol. 51, Issue. 6, Dec. 2004, pp. 3278-3284.

(56) References Cited

OTHER PUBLICATIONS

Drake, Alan J., et al., "A Self-Correcting Soft Error Tolerant Flop-Flop," 12th NASA Symposium on VLSI Design, Oct. 4-5, 2005, 5 pages.
Dumitru, Radu, et al.,"130nm Single Event Upset Performance Evaluation: Commercial vs. Hardened by Design Architectures," IEEE Radiation Effects Data Workshop, Jul. 25-29, 2011, Las Vegas, Nevada, IEEE, 6 pages.
Gadlage, M. et al., "Single event transient pulse widths in digital microcircuits," IEEE Transactions on Nuclear Science, vol. 51, Issue. 6, Dec. 2004, pp. 3285-3290.
Haddad, Nadim, et al., "Second Generation (200MHz) RAD750 Microprocessor Radiation Evaluation," European Conference on Radiation and Its Effects on Components and Systems, Sep. 19-23, 2011, Sevilla, Spain, IEEE, pp. 877-880.
Hansen, D. et al., "Clock, flip-flop, and combinatorial logic contributions to the SEU cross section in 90 nm ASIC technology," IEEE Transactions on Nuclear Science, vol. 56, Issue 6, Dec. 2009, pp. 3542-3550.
Hazucha, Peter, et al., "Measurements and Analysis of SER-Tolerant Latch in a 90-nm Dual-VT CMOS Process," IEEE Journal of Solid-State Circuits, vol. 39, Issue 9, Sep. 2004, IEEE, pp. 1536-1543.
Hindman, Nathan, et al., "Fully Automated, Testable Design of Fine-Grained Triple Mode Redundant Logic," IEEE Transactions on Nuclear Science, vol. 58, Issue 6, Dec. 2011, IEEE, pp. 3046-3052.
Hindman, Nathan, et al., "High Speed Redundant Self-correcting Circuits for Radiation Hardened by Design Logic," European Conference on Radiation and Its Effects on Components and Systems, Sep. 14-18, 2009, Bruges, Belgium, IEEE, pp. 465-472.
Hoang, T. et al., "A Radiation Hardened 16-Mb SRAM for Space Applications," IEEE Aerospace Conference, Mar. 3-10, 2007, pp. 1-6.
Knudsen, Jonathan E., et al., "An Area and Power Efficient Radiation Hardened by Design Flip-Flop," IEEE Transactions on Nuclear Science, vol. 53, No. 6, Dec. 2006, pp. 3392-3399.
Kobayashi, D. et al., "Analytical Expression for Temporal Width Characterization of Radiation-Induced Pulse Noises in SOI CMOS Logic Gates," IEEE 47th International Reliability Physics Symposium (IRPS), Montreal, Canada, 2009, pp. 165-169.
Lacoe, Ronald C., et al., "Application of Hardness-By-Design Methodology to Radiation-Tolerant ASIC Technologies," IEEE Transactions on Nuclear Science, vol. 47, No. 6, Dec. 2000, pp. 2334-2341.
Liden, Peter, et al., "On Latching Probability of Particle Induced Transients in Combinational Networks," Twenty-Fourth International Symposium on Fault-Tolerant Computing, Jun. 15-17, 1994, Austin, Texas, IEEE, pp. 340-349.
Matush, Bradley I., et al., "Area-Efficient Temporally Hardened by Design Flip-Flop Circuits," IEEE Transactions on Nuclear Science, vol. 57, No. 6, Dec. 2010, pp. 3588-3595.
Mavis, David G., et al., "Soft Error Rate Mitigation Techniques for Modern Microcircuits," 40th Annual International Reliability Physics Symposium, Dallas, Texas, Copyright: 2002, pp. 216-225.
Mitra, Subhasish, et al., "Logic Soft Errors in Sub-65nm Technologies Design and CAD Challenges," Proceedings of the 42nd Design Automation Conference, Jun. 13-17, 2005, Anaheim, California, IEEE, 3 pages.
Mitra, Subhasish, et al., "Robust System Design with Built-In Soft-Error Resilience," Computer, vol. 38, Issue 2, Feb. 2005, IEEE Computer Society, pp. 43-52.
Morgan, Keith S., et al., "A Comparison of TMR with Alternative Fault-Tolerant Design Techniques for FPGAs," IEEE Transactions on Nuclear Science, vol. 54, No. 6, Dec. 2007, pp. 2065-2072.
Nicklaw, Christopher, et al., "Hierarchical CAD Tools for Radiation Hardened Mixed Signal Electronic Circuits," Technical Report A-2, Jan. 28, 2005, Silvaco Data Systems, Santa Clara, California, 37 pages.
Quinn, Heather, et al., "A Review of Xilinx FPGA Architectural Reliability Concerns from Virtex to Virtex-5," Radiation and Its Effects on Components and Systems (RADECS), Sep. 2007, 8 pages.
Ricci, F. et al., "A 1.5 GHz 90 nm embedded microprocessor core," 2005 Symposium on VLSI Circuits Digest of Technical Papers, 2005, pp. 12-15.
Seifert, Norbert, et al., "Radiation-Induced Clock Jitter and Race," 43rd Annual International Reliability Physics Symposium, San Jose, California, 2005, IEEE, pp. 215-222.
Sexton, F.W. et al., "SEU simulation and testing of resistor-hardened D-latches in the SA3300 microprocessor," IEEE Transactions on Nuclear Science, vol. 38, Issue 6, Dec. 1991, pp. 1521-1528.
Shambhulingaiah, Sandeep et al., "Temporal Sequential Logic Hardening by Design with a Low Power Delay Element," RADECS 2011 Proceedings, Copyright: 2011, pp. 144-149.
Shuler, R. et al., "Comparison of dual-rail and TMR logic cost effectiveness and suitability for FPGAs with reconfigurable SEU tolerance," IEEE Transactions on Nuclear Science, vol. 56, Issue 1, Feb. 2009, pp. 214-219.
Sturesson, F., et al., "Radiation Characterization of a Dual Core LEON3-FT Processor," European Conference on Radiation and Its Effects on Components and Systems, Sep. 19-23, 2011, Sevilla, Spain, IEEE, pp. 938-944.
Tipton, A. D. et al., "Device-orientation effects on multiple-bit upset in 65 nm SRAMs," IEEE Transactions on Nuclear Science, vol. 55, Issue 6, Dec. 2008, pp. 2880-2885.
Turowski, M. et al., "Mixed-mode simulation and analysis of digital single event transients in fast CMOS ICs," 14th International Conference on Mixed Design of Integrated Circuits and Systems, Jun. 21-23, 2007, pp. 433-438.
Warren, K. et al., "Heavy ion testing and single event upset rate prediction considerations for a DICE flip-flop," IEEE Transactions on Nuclear Science, vol. 56, Issue 6, Dec. 2009, pp. 3130-3137.
Yao, Xiaoyin, et al., "A 90nm Bulk CMOS Radiation Hardened by Design Cache Memory," European Conference on Radiation and Its Effects on Components and Systems, Sep. 14-18, 2009, Bruges, Belgium, IEEE, pp. 473-480.
Author Unknown, "Announcing the Advanced Encryption Standard (AES)," Federal Information Processing Standards Publication 197, Nov. 26, 2001, National Institute of Standards and Technology, 51 pages.
Katsarou, K., et al., "Soft error interception latch: double node charge sharing SEU tolerant design," Electronics Letters, vol. 51, Issue 4, Feb. 2015, pp. 330-332.
Mathew, J., et al., "On the Design of Different Concurrent EDC Schemes for S-Box and GF(p)," 11th International Symposium on Quality Electronic Design, Mar. 2010, pp. 211-218.
Naseer, Riaz, et al., "DF-DICE: A Scalable Solution for Soft Error Tolerant Circuit Design," International Symposium on Circuits and Systems, May 21-24, 2006, IEEE, pp. 3890-3893.
Ramamurthy, Chandarasekaran, et al., "Physical Design Methodologies for Soft Error Mitigation Using Redundancy," 15th European Conference on Radiation and Its Effects on Components and Systems, Sep. 14-18, 2015, IEEE, 5 pages.
Intrinsic ID, "SRAM PUF: The secure silicon fingerprint", Intrinsic-Id Inc. White Paper, Jun. 2016, 6 pages.

\* cited by examiner

Hardened TMR mode replicates cache data

MULTI-MODE RADIATION HARDENED MULTI-CORE MICROPROCESSORS

RELATED APPLICATIONS

This application claims the benefit of provisional patent application Ser. No. 62/372,542, filed Aug. 9, 2016, the disclosure of which is hereby incorporated herein by reference in its entirety.

FIELD OF THE DISCLOSURE

The present disclosure relates to radiation hardening of microprocessors.

BACKGROUND

System uptime is increasingly limited by integrated circuit reliability, and modern systems have very high processing requirements. Thus a solution should have maximum performance; that is, essentially no delay increase is allowed, which precludes simple solutions such as temporal hardening techniques. Also, aerospace systems have limited power envelopes because of limited ability to remove heat in vacuum, for example. Finally, the area and power overhead allowed for hardening varies by market.

IBM servers have large (but diminishing) hardening costs. IBM servers, like the HERMES processor, use dual modular redundant register files. Additionally, on IBM servers, all registers are checkpointed on the processor. These designs also use full memory error-correcting code protection and redundant execution units. These designs generally do not fall into the appropriate thermal envelope (they are liquid cooled).

Core boundary checking is conventionally used. For example, duplicate cores or entire boards are checked and voted with an application-specific integrated circuit. However, this approach is not comprehensive; moreover, it is very difficult to resynchronize the cores after an error—the standard scenario is to reset the entire system in a controlled manner.

NASA/JPL refers to soft portions of present hardened central processing units as "glass jaws." Some examples follow:

Branch Target Buffer (BTB) addresses
  BTB branch/no-branch mispredicts are corrected by the pipeline. This often leads to the totally mistaken impression that BTBs are thus inherently hard. However, this is not true. The taken/not taken choice is checked. None of the other data is.
  Addresses are frequently not protected, and an upset target address sends a predicted branch into the weeds. Basically, if the target address is modified by a soft error (single event upset) and then if the branch is predicted (correctly), the machine will branch to the erroneous address. Then, program execution picks up at the wrong place.

Flip-Flops (FFs) selecting redundancy
  When FFs change the cache configuration, changes look like a massive upset. Basically, these FFs remove bad columns, rows, or blocks from being used. If these bits are upset, then suddenly the cache is reconfigured and potentially non-operational sections are exposed to usage.
  Many vendors, including IBM and Intel, use hardened FFs for this, because of the catastrophic impact of such an error (single-event functional interrupt), similar to what happens when static random-access memory configuration bits are upset.

The lesson is that it can be very difficult to predict the effect of a processor error, particularly if the code is unknown. Ideally, finding adequate protection for everything is necessary. The hardening needs the correct weight (i.e., speed, power, and area impact) for an application. However, a single central processing unit may be used in many such applications.

As such, there is a need for improved radiation hardened microprocessors.

SUMMARY

Systems and methods for multi-mode radiation hardened multi-core microprocessors are disclosed. In some embodiments, a triplicated circuit includes a first core logic, a second core logic, a third core logic, and bus arbitration and control circuitry. The triplicated circuit is configurable to operate in both a Triple-Modular Redundant (TMR) mode of operation and a multi-threaded mode of operation. In some embodiments, there is essentially no overhead in soft mode and low overhead (power only) in hard mode. In most applications, it is expected that portions of missions require very hard systems (e.g., landing) where a failure is catastrophic. However, other portions require essentially no hardening (digital signal processor and signal processing activities) but much better throughput. Consequently, there is a huge opportunity to develop computer processors with low overhead in soft mode and unprecedented hardness in hard mode.

Hardness requirements depend on mission. The cores can be configured hard or soft in a mix/match manner. Thus, the same hardware can support different missions, and mission requirements can vary with time. For example, in a spacecraft, consider signal processing during transit and lander control at descent. The former has minimal hardening requirements—a simple retransmit can fix errors. In the latter case, a soft error may destabilize the craft or otherwise cause it to crash.

In some embodiments, the first core logic, the second core logic, and the third core logic are programmable by software. In some embodiments, the first core logic, the second core logic, and the third core logic implement a Central Processing Unit (CPU) or a Digital Signal Processer (DSP).

In some embodiments, the triplicated circuit also includes a first memory associated with the first core logic, a second memory associated with the second core logic, and a third memory associated with the third core logic. The first memory, the second memory, and the third memory are connected via self-correcting flip-flops when the triplicated circuit is configured to operate in the TMR mode. In some embodiments, the self-correcting flip-flops of the first memory, the second memory, and the third memory cause the first memory, the second memory, and the third memory to have the same value even if one was originally different.

In some embodiments, the triplicated circuit also includes a first cache associated with the first core logic, a second cache associated with the second core logic, and a third cache associated with the third core logic. A cache write by the first core logic, the second core logic, and the third core logic are passed through a majority gate such that the first cache, the second cache, and the third cache receive the same value during the cache write when the triplicated circuit is configured to operate in the TMR mode of operation.

In some embodiments, the bus arbitration and control circuitry is configured to combine the values from the first core logic, the second core logic, and the third core logic and automatically correct any mismatch, appearing as one core on the bus when the triplicated circuit is configured to operate in the TMR mode of operation.

In some embodiments, the bus arbitration and control circuitry is configured to arbitrate the values from the first core logic, the second core logic, and the third core logic, appearing as three cores on the bus when the triplicated circuit is configured to operate in the multi-threaded mode of operation.

In some embodiments, the triplicated circuit is implemented in a Field Programmable Gate Array (FPGA).

In some embodiments, a method of operating a triplicated circuit including a first core logic, a second core logic, a third core logic, and bus arbitration and control circuitry includes determining to operate in either a TMR mode of operation or a multi-threaded mode of operation.

In some embodiments, the triplicated circuit also includes a first memory associated with the first core logic, a second memory associated with the second core logic, and a third memory associated with the third core logic. The method also includes triplicating the first memory, the second memory, and the third memory via self-correcting flip-flops when the triplicated circuit is configured to operate in the TMR mode.

In some embodiments, triplicating the first memory, the second memory, and the third memory includes the self-correcting flip-flops of the first memory, the second memory, and the third memory causing the first memory, the second memory, and the third memory to have the same value even if one was originally different.

In some embodiments, the triplicated circuit also includes a first cache associated with the first core logic, a second cache associated with the second core logic, and a third cache associated with the third core logic. The method also includes passing a cache write by the first core logic, the second core logic, and the third core logic through a majority gate such that the first cache, the second cache, and the third cache receive the same value during the cache write when the triplicated circuit is configured to operate in the TMR mode of operation.

In some embodiments, the method also includes combining, by the bus arbitration and control circuitry, values from the first core logic, the second core logic, and the third core logic and automatically correcting any mismatch, appearing as one core on the bus when the triplicated circuit is configured to operate in the TMR mode of operation.

In some embodiments, the method also includes arbitrating, by the bus arbitration and control circuitry, values from the first core logic, the second core logic, and the third core logic, appearing as three cores on the bus when the triplicated circuit is configured to operate in the multi-threaded mode of operation.

In some embodiments, the method also includes reading the values of the first cache, the second cache, and the third cache and writing the values back to the first cache, the second cache, and the third cache to ensure the first cache, the second cache, and the third cache contain the same value.

In some embodiments, the triplicated circuit is implemented in a FPGA. In some embodiments, the method also includes generating a first error signal when one stored value of the first core logic, the second core logic, and the third core logic mismatches. In some embodiments, the method also includes generating a second error signal when one of the first core logic, the second core logic, and the third core logic mismatches a number of times exceeding a threshold.

In some embodiments, the method also includes, in response to generating the second error signal, generating a FPGA configuration scrub for the core logic indicated by the second error signal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to an approach to triplicate the processor cores into triplets, that is, groups of three processors. Each triplet is constructed as one unit. The cores run independently (separate software threads) in an unhardened operational mode for maximum performance. The hardware is Triple-Modular Redundant (TMR), that is, self-correcting, in hardened mode. The hardware has one third the throughput but is hardened against radiation-induced soft-errors with vanishing error rates. This allows mission-specific (or mission portion-specific) hardening with the same hardware having minimal compromise in performance in unhardened mode.

Systems and methods for multi-mode radiation hardened multi-core microprocessors are disclosed. In some embodiments, a triplicated circuit includes a first core logic, a second core logic, a third core logic, and bus arbitration and control circuitry. The triplicated circuit is configurable to operate in both a TMR mode of operation and a multi-threaded mode of operation. In some embodiments, there is essentially no overhead in soft mode and low overhead (power only) in hard mode. In most applications, it is expected that portions of missions require very hard systems (e.g., landing) where a failure is catastrophic. However, other portions require essentially no hardening (digital signal processor and signal processing activities) but much better throughput. Consequently, there is a huge opportunity to develop computer processors with low overhead in soft mode and unprecedented hardness in hard mode.

Hardness requirements depend on mission. The cores can be configured to be hard or soft in a mix/match manner. Thus, the same hardware can support different missions, and mission requirements can vary with time. For example, in a spacecraft, consider signal processing during transit and lander control at descent. The former has minimal hardening requirements—a simple retransmit can fix errors. In the latter case, a soft error may destabilize the craft or otherwise cause it to crash.

The key to rapidly hardening commercially available Intellectual Property (IP) is to be able to produce a Register Transfer Language (RTL) version of said IP that is hardened but also is provably identical in function to the original, at least in the unhardened mode of operation. Since formal logic equivalency checking methods work by comparing OBBs of logic between sequential elements, the subsequent methods of the present disclosure are provably strictly correct.

Figure 1:
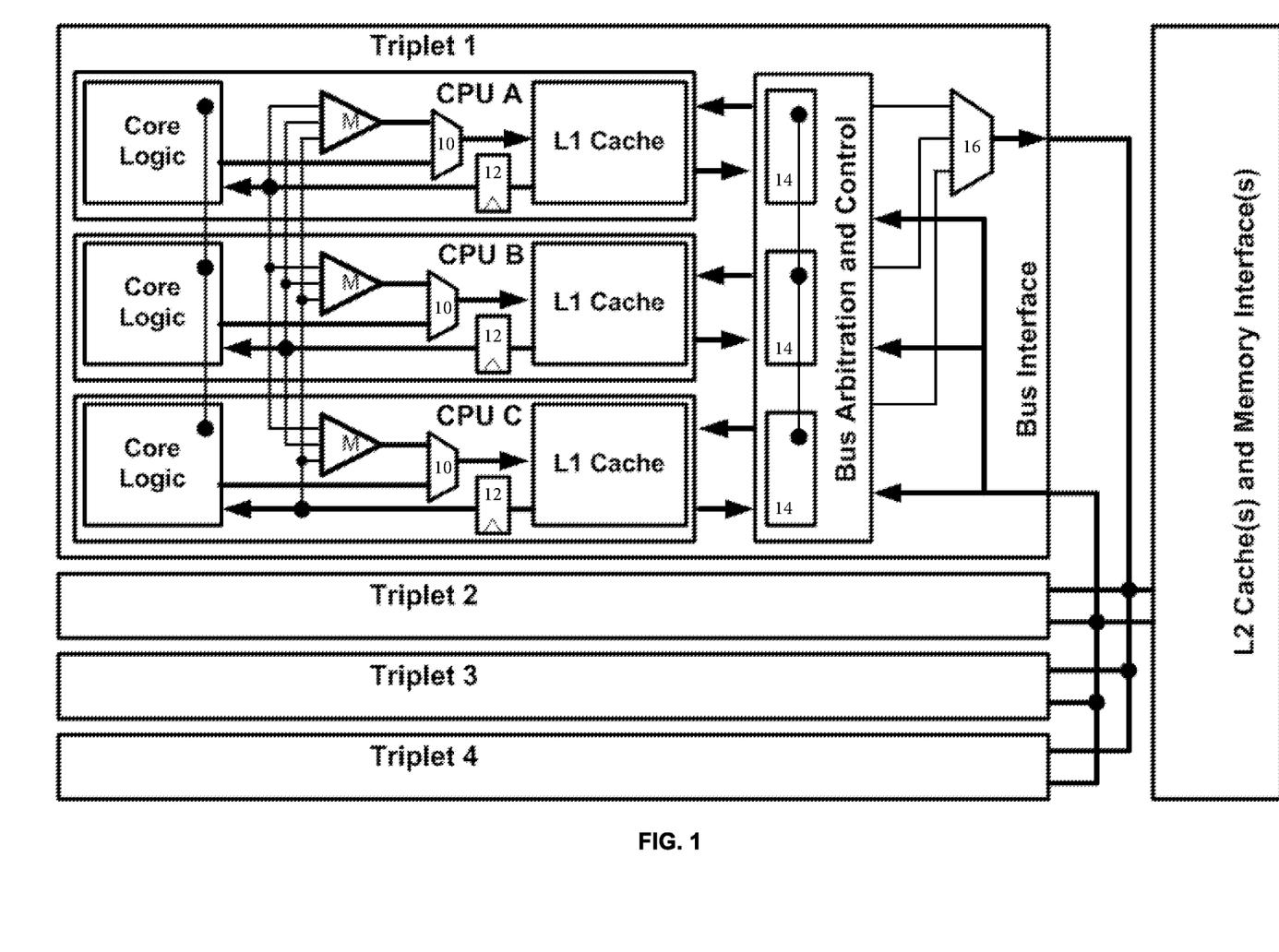
FIG. 1 is a schematic showing a 12-core example of a triplicated circuit according to some embodiments of the present disclosure.

In a 12-core example, shown in FIG. 1, the RTL requires very minor code changes to allow TMR cache correction and Single Event Upset (SEU) repair. That the changes be very small is essential, since RTL adds the least validation effort and very straightforward implementation that is almost completely automated.

There are no core logic changes, just self-correcting TMR sequential circuit insertion and triplication of the RTL modules, as described subsequently. Any synthesized logic is triplicated, and soft errors are repaired by the automatic repair in the TMR self-correcting Flip-Flops (FFs) in the hardened mode. The bus interface is external. It must be TMR or be arbitrated in a separate thread (unhardened) mode. This is the point at which there may be need for manual changes and validation effort.

As shown in FIG. 1, triplicated circuit Triplet 1 includes a first, second, and third core logic. The outputs of these are connected to multiplexers 10 before entering the L1 cache. In this case, the multiplexer 10 can choose between the actual output value (if operating in soft mode) or the output of majority gate M which seeks to correct any mistake by replacing the value with the most common value from the three core logics. In this embodiment, the L1 cache is read out through FFs 12. The bus arbitration and control circuitry also includes synchronized FFs 14 which in some embodiments can further correct output errors before presenting the value to the bus interface. In this embodiment, multiplexor 16 can be used if the triplicated circuit is being operated in soft mode to allow all three core logics to communicate with the bus interface.

Figure 2:
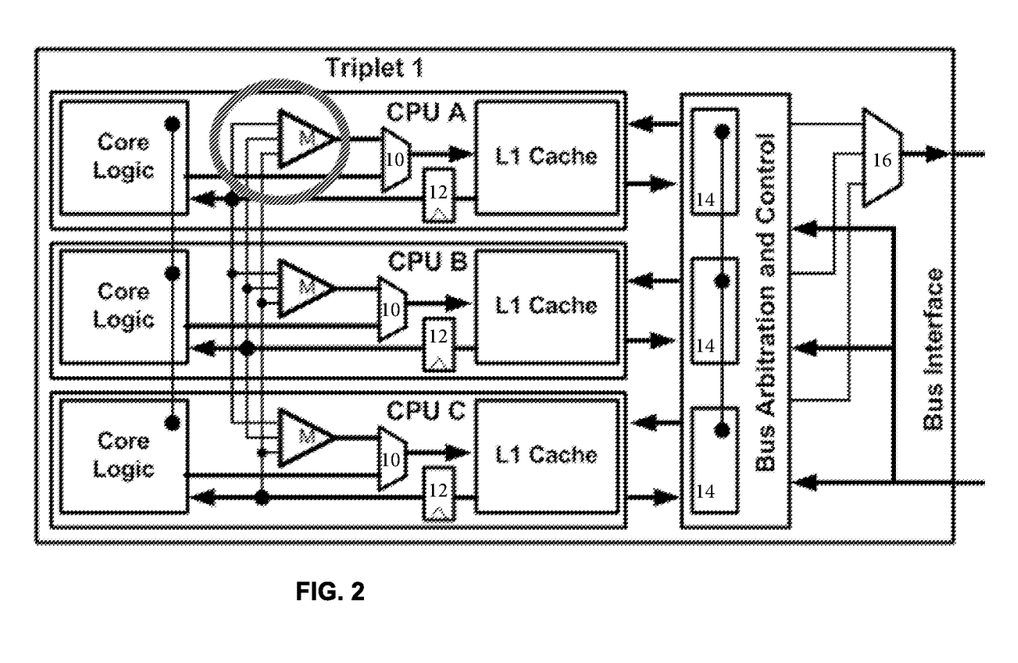
FIG. 2 is a schematic showing how hardened Triple-Modular Redundant (TMR) mode replicates cache data according to some embodiments of the present disclosure.

As shown in FIG. 2, in some embodiments, cache address, operation, and data are voted at the boundary in TMR hardened mode: the multiplexer 10 after the voter chooses the voted rather than the single Central Processing Unit (CPU) core logic values in TMR hardened mode. Thus, any logic error (single event transient or SEU) in a single core will not propagate to the caches.

There are options for data from the caches (vote or not). In FIG. 2, the non-voted option is shown, in which data from CPU A L1 cache are not voted as they are sent to the core logic. In this scenario, an error in data is voted out at write back to the cache or output bus.

Figure 3:
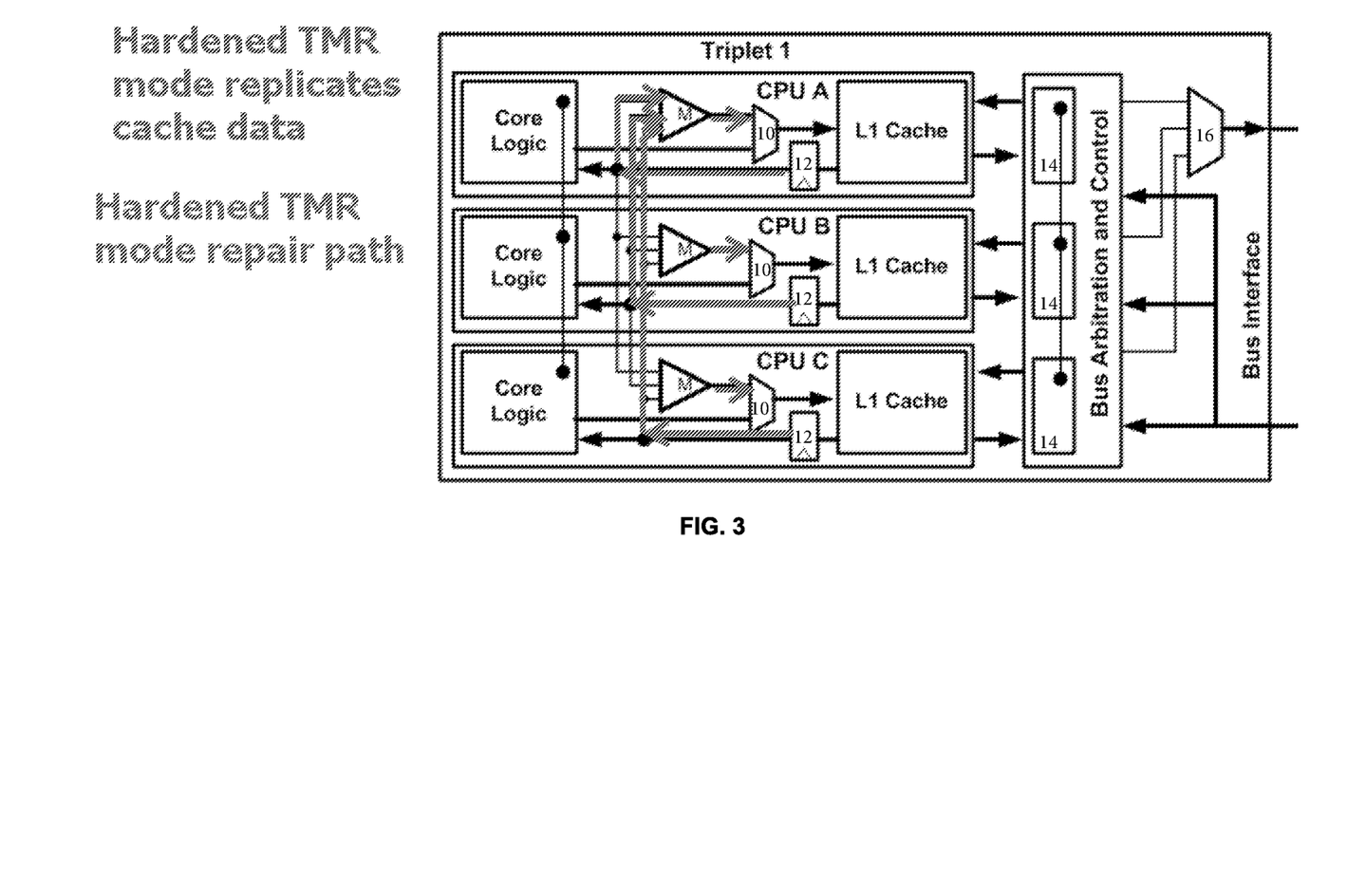
FIG. 3 is a schematic showing the hardened TMR mode repair path of FIG. 2 according to some embodiments of the present disclosure.

As shown in FIG. 3, in the hardened mode, the bus arbitration and control logic combines the values from the three core triplet and automatically corrects any mismatch. The triplet appears as one core on the bus.

Since the cache data are replicated, they can simply be voted out by reading and writing each cache location with the same data. The corrected data are automatically written back to all caches. This requires software only, which is a big advantage. The software does not need any awareness of the mechanisms or special control constructs.

This method of reading and writing every location can be performed using cache lookups, but this does not fix errors that may occur in the tags. In some embodiments, special cache instructions, which exist on all processors, can be used to read and write every cache location. The same mechanisms can be used to vote and repair Translation Lookaside Buffer (TLB) data and other arrayed structures. TLB data are basically page address caches.

Figure 4:
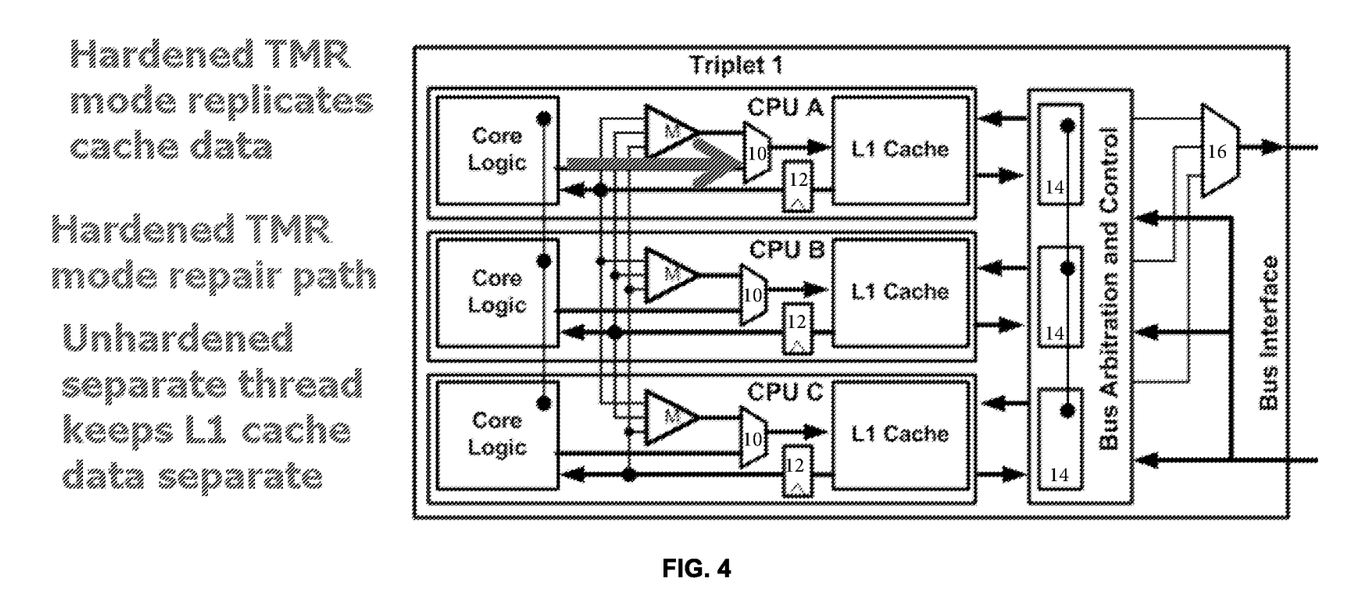
FIG. 4 is a schematic showing the unhardened separate thread that keeps L1 cache data separate according to some embodiments of the present disclosure.

FIG. 4 illustrates how the unhardened mode of operation keeps L1 cache data separate. In the unhardened mode, each core operates independently. In this mode, the bus is arbitrated between the cores. All data are independent. The only place validation effort is required is the two modes in the bus arbitration and control circuitry, plus a bit of validation proving that the read/write of each cache location works.

Method to Automatically Triplicate the Standard IP RTL

Related art provides multiple node charge collection protection for TMR logic by placing the logic belonging to different TMR domains in distinct regions with minimized interaction between the regions. It is well known that this is essential to avoiding a single radiation particle from upsetting circuits in two domains and thus thwarting TMR.

Figure 5:
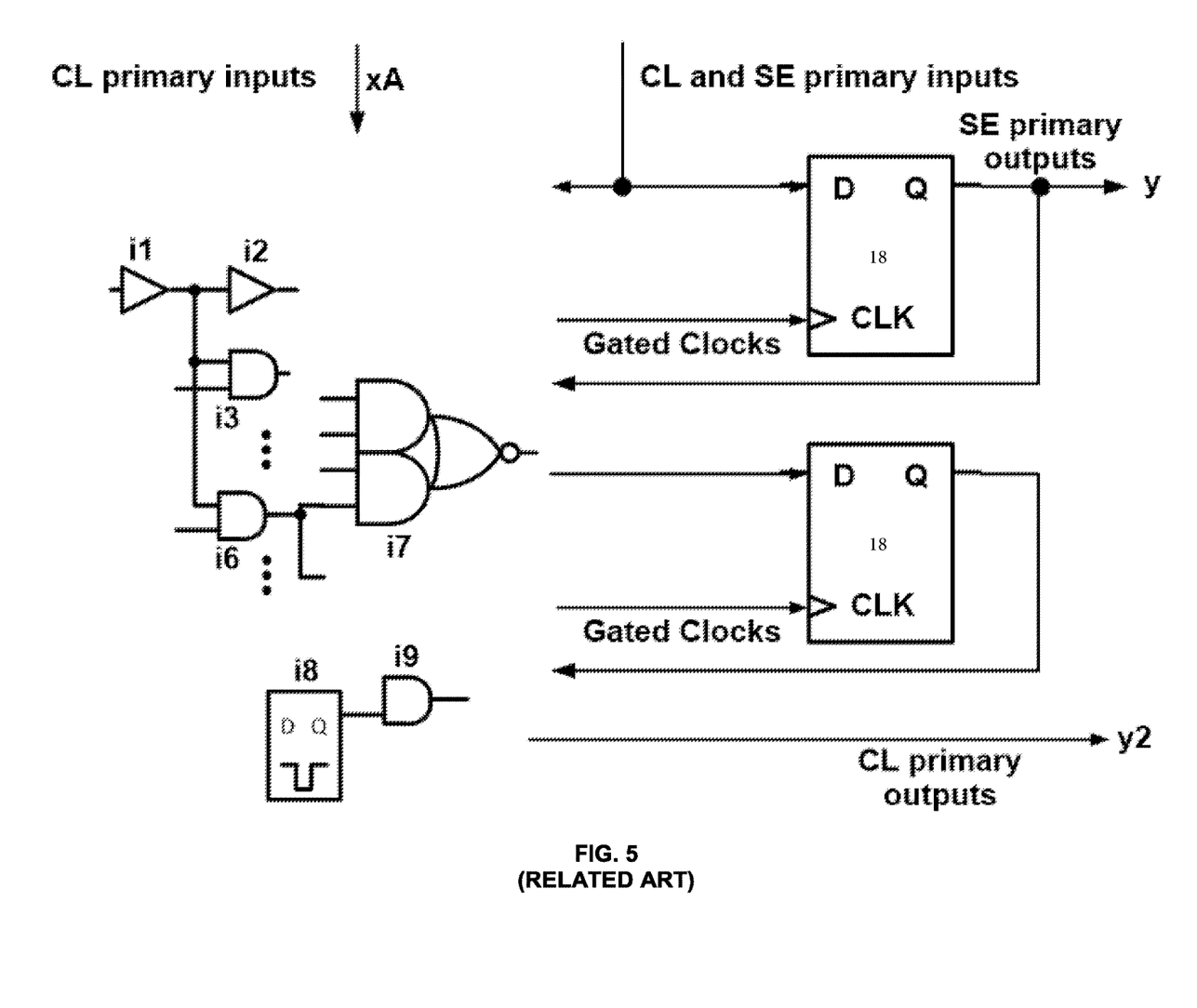
FIG. 5 is a schematic showing in related art the initial non-redundant constituent components.

As discussed above, the key to rapidly hardening commercially available IP is to be able to produce an RTL version of said IP that is hardened but also is provably identical in function to the original, at least in the unhardened mode of operation. Since formal logic equivalency checking methods work by comparing OBBs of logic between sequential elements, the subsequent methods of the present disclosure are provably strictly correct. The related art operated on the initial IP (FIG. 5) shows non-redundant latches, flip-flops, and combinational logic. A latch 18 in this case is part of an integrated clock gating cell commonly used to provide a clock gating signal. It is easiest and useful to triplicate blocks on a block-by-block basis, since that allows easier formal verification of the results.

A semiconductor IP core, or IP block, is a reusable unit of logic layout design. IP cores may be licensed or purchased and used by another. IP cores are sometimes acquired as synthesizable RTL or in a hardware description language such as Verilog or Very High Speed Integrated Circuit (VHSIC) hardware description language. IP cores delivered as RTL enable designers to modify designs at the functional level. IP cores are also sometimes available as gate-level netlists. The netlist is a Boolean algebra representation of the logical function of the IP implemented as generic gates.

Figure 6:
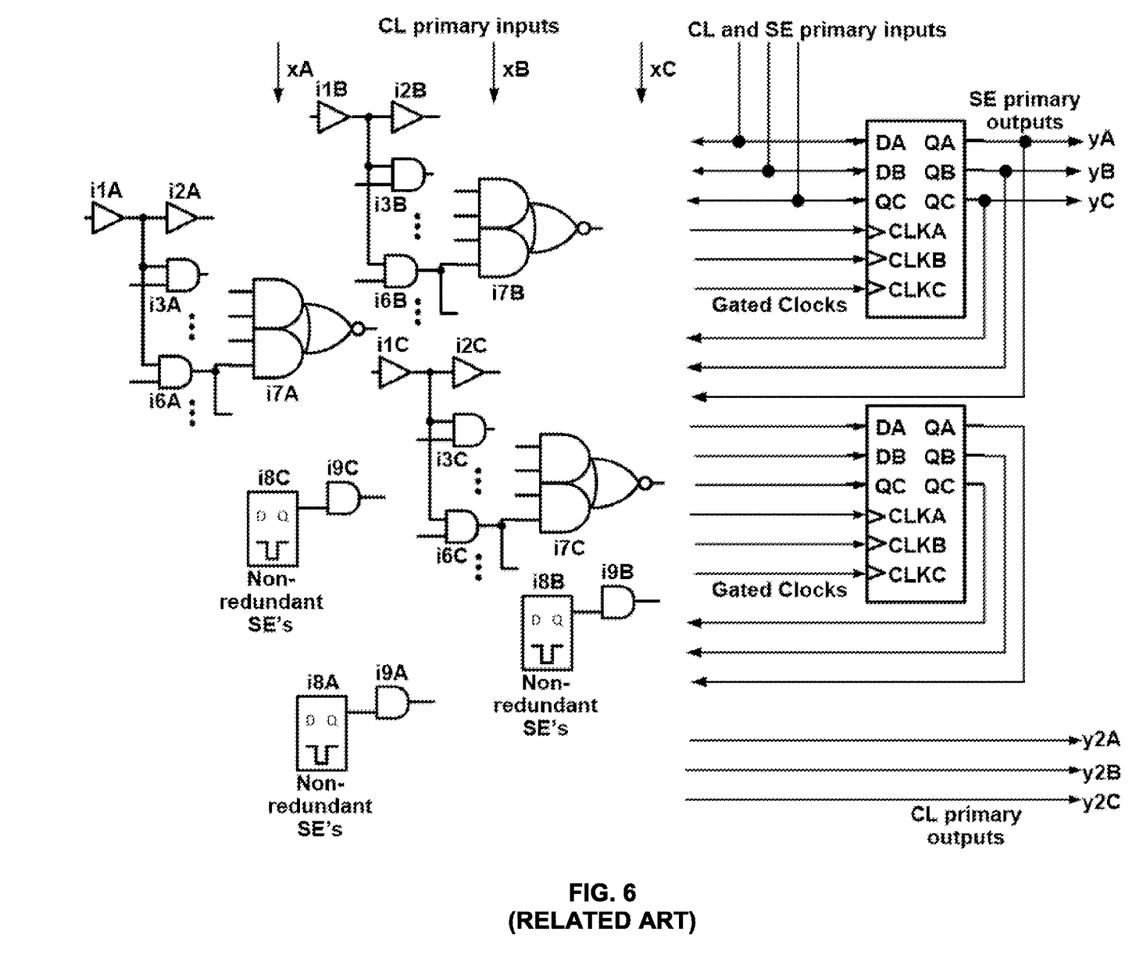
FIG. 6 is a schematic showing related-art triplicated redundant constituent components.

The related-art method to triplicate the block works on a gate-by-gate basis, triplicating the logic to provide an A, a B, and a C copy of each combinational logic cell. Since in the integrated clock gater, the latches are integral, these are triplicated but not self-correcting. In this case, the input to the latch is updated every cycle, and the layout provides sufficient separation so that no two latches are likely to be simultaneously upset by a single impinging radiation particle. Thus, self-correction would not be beneficial. The FF sequential elements in FIG. 5, which may also include latch sequential elements, are not triplicated. The FF signals are triplicated, but the FFs are combined into Triple Redundant Self-Correcting FFs (TRSCFFs). The triplication and use of the TRSCFFs is shown in FIG. 6. The gates and flip-flops reside at the same level of hierarchy in the block being triplicated (hardened). However, this method complicates the Automated Placement and Routing (APR) algorithms used in the standard commercial computer-aided design tools. In some embodiments, it is essential to use standard tools, since they are highly refined to provide optimum layout and timing for the resulting circuits. Creating such a capability for radiation-hardened circuits from scratch is not cost effective. Thus, the methods outlined in the present disclosure maximize the use of commercial tools.

In the related-art method, each gate, latch, and FF is assigned to an A region, a B region, a C region, or TRSCFF core site, respectively, on an individual basis. This is easily done by name since the triplicating programs provide correct names when triplicating the elements, as is evident in FIG. 6. However, during the APR process, optimizations may add gates to paths, that is, buffer the logic, and when gates are assigned individually to the regions (fences), the gates added by the computer-aided design tool are not assigned to a corresponding region. This complicates and slows the APR operations since special programs must apply either breadth or depth to first search algorithms on the fan-in and fan-out signals to determine their appropriate region assignment. This is further complicated by the TRSCFFs interacting with all regions. Thus, an improved method is desirable.

In the improvement method of the present disclosure, the triplication programs assign all gates and other latches internal to the combinational logic blocks to hierarchical combinational blocks. This allows the hierarchical blocks to be assigned en masse to the appropriate A, B, and C regions. The commercially available APR tools thus recognize that when buffering a signal or making any other logic modification during placement, routing, and timing optimization that the new gate should be assigned to the same region as the block to which it belongs. The resulting block diagram shown in FIG. 7 is logically identical to FIG. 6 but facilitates much more efficient placement to provide multiple-node charge collection protection.

Figure 7:
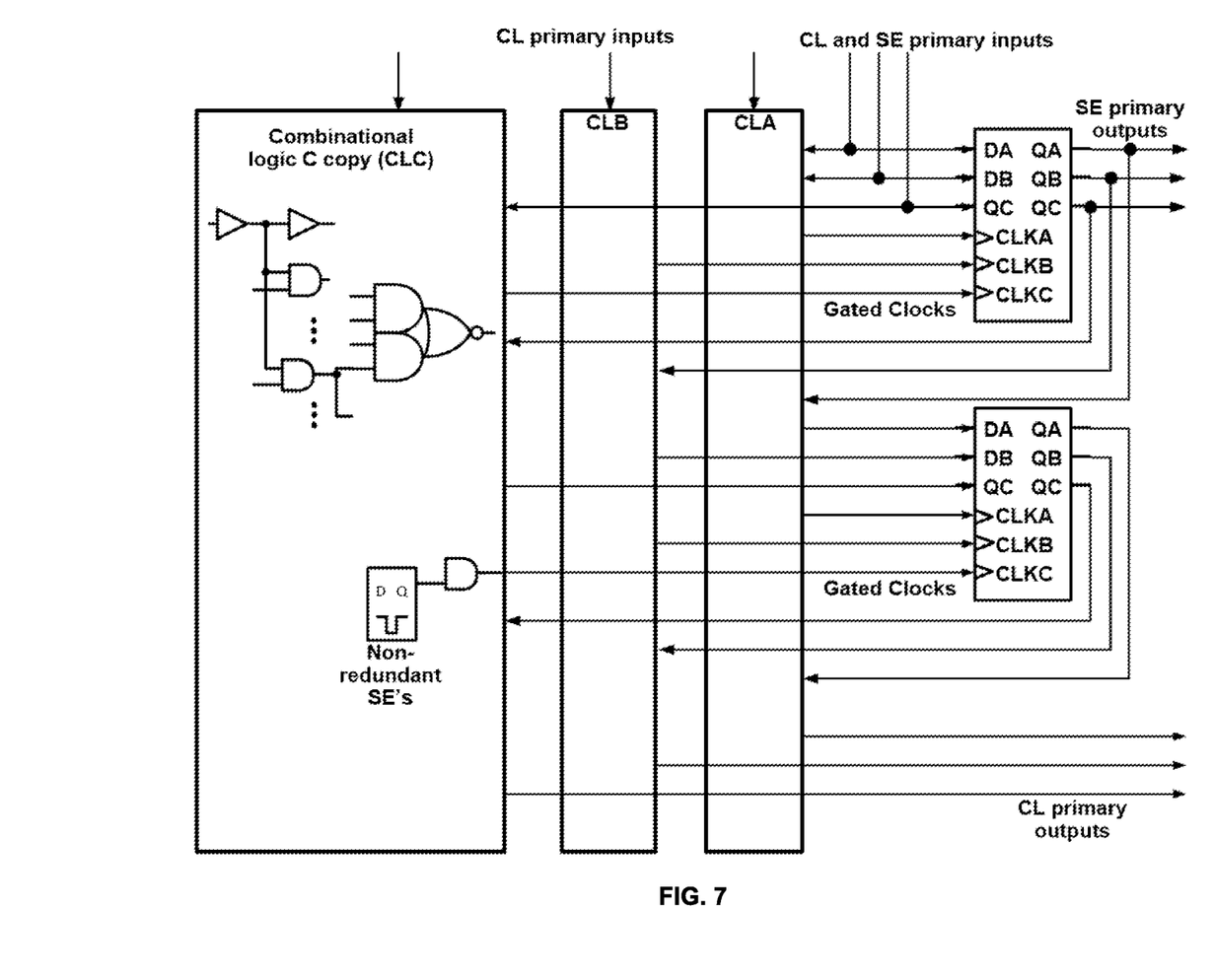
FIG. 7 is a schematic showing improved triplicated redundant constituent components.

FIG. 7 is a schematic showing improved triplicated redundant IP constituent components. Each A, B, C gate is assigned to a specific hierarchical block. The logic in blocks A (CLA) and B (CLB) is identical to that in block C (CLC), but this is not shown for clarity. FIG. 7 shows that there may be non-redundant Sequential Elements (SEs), that is, non-redundant latches (or FFs). These commonly occur in clock gating circuitry. Clock gating is essential to providing a low-power design, and the self-correction mechanisms in the TRSCFFs provide full correction of any internal state that mismatches the majority when the clock is gated off. Thus, the design is fully hardened in the TMR mode.

The pseudo code that follows provides the algorithm for splitting the non-redundant IP (as Verilog) into the form of triplicated Verilog (as multiple files). Those skilled in the art will understand that the order of the operations may be changed and specific approaches may be altered without changing the key aspects of the present disclosure. All such operational changes and alterations are considered within the scope of the present disclosure. The algorithm produces a top-level Verilog that contains the self-correcting TMR SEs and the top-level signals. A separate file is produced for each of the A, B, and C hierarchical submodules produced.

The input is a gate-level synthesized netlist, so synthesis must be run on the non-TMR RTL first. The program then reads the resulting RTL and creates the top-level RTL module and each sub-module. The top level instantiates the triplicated top-level signals and Self-Correcting TMR (SCTMR) FFs, or SCTMR latches as needed.

Wires that are primary inputs to FFs and Combinational Logic (CL) blocks or are only inputs to the CL blocks are added as pins on the appropriate triplicated CL block. Similarly, wires that are inputs to the SCTMRFFs are added as outputs on the appropriate (A, B, or C) CL block. To simplify the process, any self-correcting sequential D or CLK input is added to the appropriate CL block output list, and any self-correcting sequential Q output is added as an input to the CL block input list. In some embodiments, a check is made later to determine if one of these signals is a top-level module primary input or output. If so, it is retained on the input or output list of the CL block only if it is also on the usedlist, since the usedlist signifies that signal is used by a gate in the CL. It should be obvious to those skilled in the art that this ordering of operations may be altered. However, this ordering was chosen so that all gate declarations would be read and triplicated, thereby putting its signals on the appropriate usedlist, before cleaning the CL block interface of top-level pins driving sequential circuits directly.

Buses are handled by treating their individual signals until the end, where wire and pin declarations are compressed into the appropriate buses. To accomplish this, bus declarations are added to a bus list. In this manner, buses can be treated as individual wires in the netlist triplication process, but as single declarations at the module level.

Any signal that is neither a top-level pin nor a TMR FF input or output, is by definition a local signal in the TMR blocks. Adding these to a list, that is, the usedlist shown in the pseudocode, for each CL block after triplication allows these declarations to be saved and later output to the appropriate netlist. Pseudo-code 1 is as follows:

```
Open non-TMR-verilog-file for input
Open TMR-verilog-file-main for output
Open TMR-verilog-fileA for output
Open TMR-verilog-fileB for output
Open TMR-verilog-fileC for output
// each list here has an A, B, and C copy (not shown for brevity)
while input
  // module declaration and file setup
  if (module declaration)
    change module name to main (C)
    foreach (pin)
      triplicate module pins and output top level pin list
      add to pinlist
  create the combinational logic modules in each TMR-verilog-file
    (A, B, and C)
  // signal declaration handling
  foreach (signal) // declaration, i.e., input, output, or wire)
    triplicate signal
```

-continued

```
    if (signal is bus)
        add to buslist if not already there
// wires connected to FFs will be wires in the top module, but
    pins
// in the TMR combinational logic modules, otherwise local
    signals in
// one of the TMR combinational logic blocks
if (wire)
    if (wire is bus)
        add to buslist if not already there
    add to wirelist // to check FF pins later
foreach (sequential element) // any FF or latch
    create a TMR sequential element in the top level, i.e., TMR-
        verilog-file-main
    adapt signal names to TMR conventions
    foreach (sequential element pin)
        foreach (D input)
            add D input signal name to corresponding
                logic_block_outputlist if not already there // may
                remove later
            add D input signal name to top level signal list if not
                already there
        foreach (Q output)
            add Q output signal name to corresponding
                logic_block_inputlist if not already there // may
                remove later
            add Q output signal name to top level signal list if not
                already there
        foreach (CLK input) // clock gaters are in CL, so these are
            always correct
            add CLK input sign. name to corresponding
                logic_block_outputlist if not already there
            add CLK input signal name to top level signal list if not
                already there
    foreach (gate) // everything else. No recursion
        triplicate gate and place in respective TMR CL block
            gatestring
        add each gate signal to usedlist if not already there
// input file empty... clean up
// sequential D and Q signals were automatically added to the
    combinational logic blocks
// as inputs and outputs
// however, this may not be the case, i.e. it may be a primary top
    level input or output
foreach (signal)
    if (signal is on logic_block_inputlist)
        remove from logic_block_outputlist // it is a top block
            primary input
    if (signal is bus)
        remove any redundant bus signals of the same name // not
            checked earlier
// output CL block verilog text
foreach (A, B, C combinational logic module)
    foreach (logic_block_pinlist)
        print module declaration
    foreach (logic_block_outputlist)
        print output declaration
    foreach (logic_block_inputlist)
        print input declaration
    print gatestring
close files
```

Implementation in a Field-Programmable Gate Array (FPGA) Instead of an Application-Specific Integrated Circuit (ASIC)

Figure 8:
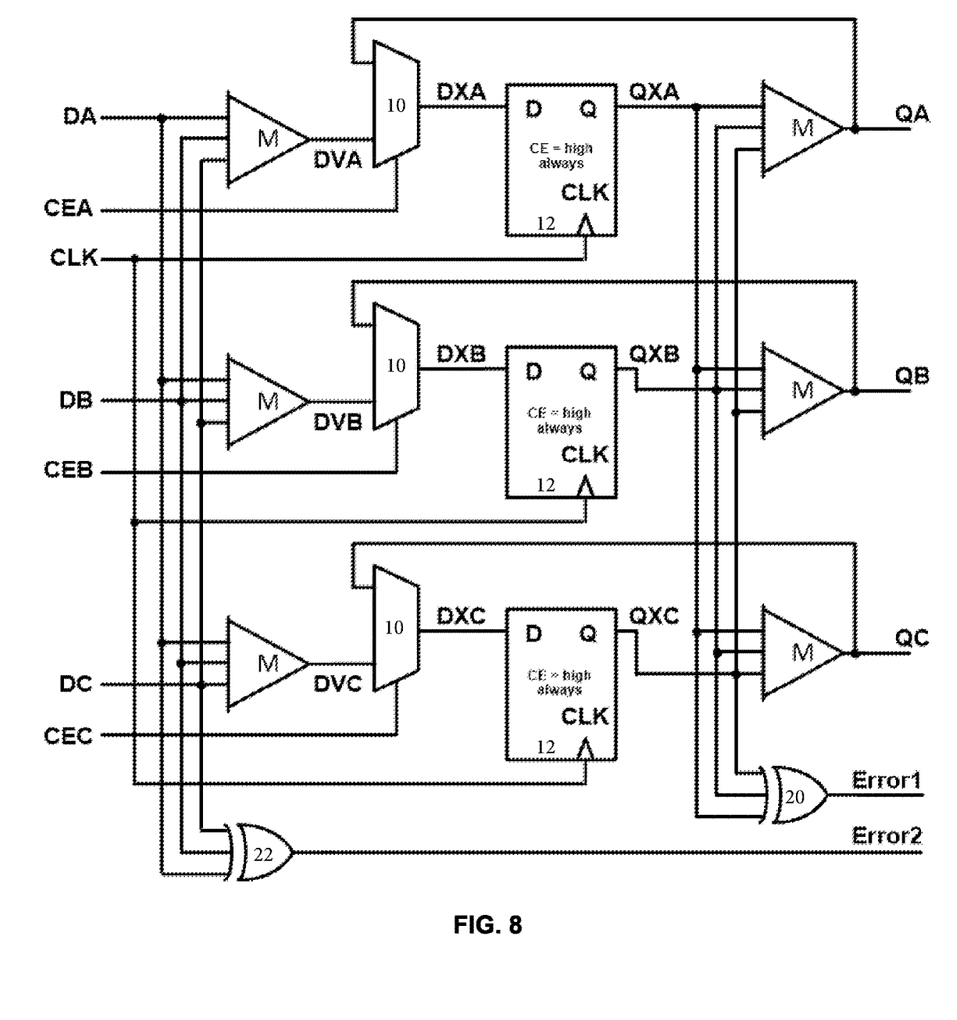
FIG. 8 is a schematic showing a self-correcting TMR Flip-Flop (FF) implementable using Field Programmable Gate Array (FPGA) lookup tables and FFs according to some embodiments of the present disclosure.

FPGAs are increasingly useful for radiation hardened circuits because of the relatively low cost of programming them to specific functions. TMR is commonly used but is handicapped by the lack of existing TMR IP. The methods of the present disclosure may be used to provide TMR microprocessor and other commercial IP functionality in a hardened circuit. The TRSCFFs must be implemented using multiple FPGA lookup tables and FFs. One such approach is shown in FIG. 8.

FPGAs have poor clock skew if the clocks are TMR clocks, so a single clock is used for the SCTMR circuit. The input majority gates M connected to DA, DB, and DC are optional. In this circuit, any cycle that does not load the FFs 12 is a correction cycle where the TMR voted value is loaded into all three FFs 12. Thus, the normal Clock Enable (CE) of the FPGA FFs 12 is always asserted to clock the FFs 12. To load the FFs 12 on a TMR clock enable assertion, the multiplexer 10 selects CEA, CEB, and CEC as determined by each TMR CL driving the multiplexer 10 choosing between the input and the voted feedback is used. Thus, each FF 12 is corrected on any cycle that does not load it with new data.

Static random-access memory-based FPGAs have the most likelihood of soft-error upset in their configuration memory because of the large number (over fifty million) of bits in large FPGAs. Such a configuration memory upset can cause one of the TMR circuits to take on a new erroneous circuit configuration, causing a persistent error rather than a transient error that a soft-error in the TMR circuits would cause.

The error signal is helpful, since it can be aggregated from all the SCTMR circuits to provide an indication that a configuration static random-access memory upset has occurred. As shown, Error1 is the output of Exclusive OR (XOR) gate 20 which detects any discrepancy in the three values. Error2 is similarly the output of XOR 22 which checks for a discrepancy for the data coming out of the core logic. Since it can be assumed that the data going into the core logics has been checked, Error2 is most likely to detect a configuration error because it monitors the CL driving the element.

Any multiplicity of such error indications or Error1 being on after a correction cycle is an indicator that the circuit function has changed to produce an erroneous signal in one of the TMR domains. If this occurs, the appropriate response is to signal a configuration memory scrub or renewal cycle to remove the error before continuing operation. This may occur on only one CPU triplet in some FPGAs so that useful work may continue in the others while the scrub operation occurs.

Thus, upon detection of any, or at least a persistent error signal, the CPU should halt and trigger a FPGA configuration memory scrub (local or global) to ensure that the error, if caused by a configuration soft-error, is mitigated. The actual scrub type and mechanism can vary and may be internal or external to the FPGA.

Figure 9:
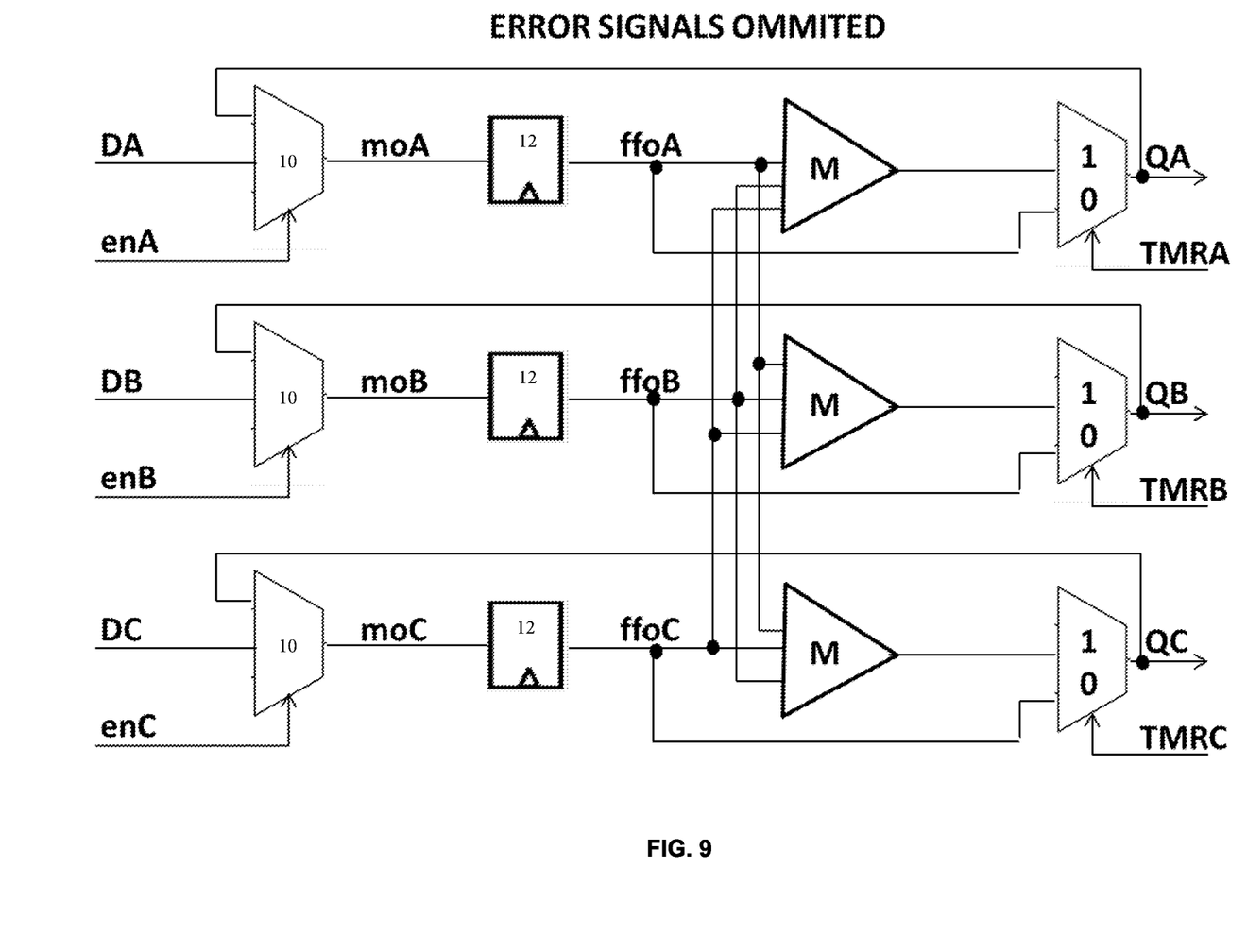
FIG. 9 is a schematic showing another embodiment of triplicated circuitry that could be implemented in an FPGA.

FIG. 9 illustrates another embodiment of a triplicated circuit that could be implemented in an FPGA. Whenever enA, enB, or enC are not asserted, the FFs 12 get the majority voted feedback value, and thus the retained values are self-corrected if in error. If enA, enB, or enC are asserted, the FFs 12 get the input value. In this embodiment, there is no input majority gate M as in FIG. 8. This allows the selection between the TMR mode of operation and the non-TMR mode of operation less complicated.

When the triplicated circuit shown in FIG. 9 is operated in the TMR mode of operation, if there is a soft error on signal TMRB, then the non-redundant value is propagated on QB. However, since the design signals errors, configuration errors are caught to allow immediate offline correction. Therefore, in this embodiment, the discussion focuses on soft error behavior. There is a vanishing probability of a simultaneous error on ffoB and the output is correct. In the event it is not correct, it will be corrected on all fanout paths in the next stage. When the transient soft error on TMRB ends, the TMR voted output on ffoB is again used.

The present disclosure includes, but is not limited to, the following:

A triplicated circuit that can run in a TMR or multi-threaded mode
  wherein the triplicated circuit is programmable by software, for example, a CPU or DSP,
  wherein memories are triplicated,
  wherein memory inputs are voted, and
  wherein the bus interface can operate in a TMR or multi-threaded mode.

The method of automatically triplicating a RTL IP circuit and inserting self-correcting FFs that can operate as three separate FFs or three self-correcting FFs
  using a software program to triplicate RTL IP,
  wherein the software program produces a separate block for each copy of the combinational logic,
  wherein the separate blocks are assigned to separate fences in automated placement and routing, and
  wherein the IP is a microprocessor.

Self-correcting TMR FFs implemented in a FPGA,
  wherein the FFs generate an error signal when one stored value mismatches, and
  wherein the FFs generate an error signal when one input mismatches; and
  the method of generating a FPGA configuration scrub in response to an error signal, and
  the design of the triplicated circuit implemented in an FPGA with self-correcting TMR FFs, by using the software program to triplicate RTL IP.

The following acronyms are used throughout this disclosure.
  APR Automated Placement and Routing
  ASIC Application-Specific Integrated Circuit
  BTB Branch Target Buffer
  CE Clock Enable
  CL Combinational Logic
  CPU Central Processing Unit
  FF Flip-Flop
  FPGA Field Programmable Gate Array
  IP Intellectual Property
  RTL Register Transfer Language
  SCTMR Self Correcting TMR
  SE Sequential Element
  SEU Single Event Upset
  TLB Translation Lookaside Buffer
  TMR Triple-Modular Redundancy
  TRSCFF Triple Redundant Self-Correcting FF
  VHSIC Very High Speed Integrated Circuit
  XOR Exclusive OR Those skilled in the art will recognize improvements and modifications to the preferred embodiments of the present disclosure. All such improvements and modifications are considered within the scope of the concepts disclosed herein and the claims that follow.

What is claimed is:

1. A triplicated circuit, comprising:
  a first core logic, a second core logic, and a third core logic;
  a first memory associated with the first core logic, a second memory associated with the second core logic, and a third memory associated with the third core logic; and
  bus arbitration and control circuitry;
  where:
    the triplicated circuit is configurable to operate in both a Triple-Modular Redundancy (TMR) mode of operation and a multi-threaded mode of operation; and
    the first memory, the second memory, and the third memory are connected via self-correcting flip-flops when the triplicated circuit is configured to operate in the TMR mode of operation.

2. The triplicated circuit of claim 1 wherein the first core logic, the second core logic, and the third core logic are programmable by software.

3. The triplicated circuit of claim 2 wherein the first core logic, the second core logic, and the third core logic implement at least one of a Central Processing Unit (CPU) or a Digital Signal Processor (DSP).

4. The triplicated circuit of claim 1 wherein the self-correcting flip-flops of the first memory, the second memory, and the third memory cause the first memory, the second memory, and the third memory to have a same retained value even if one has a different initial value.

5. The triplicated circuit of claim 1 further comprising:
  a first cache associated with the first core logic, a second cache associated with the second core logic, and a third cache associated with the third core logic;
  where a cache write by the first core logic, the second core logic, and the third core logic are passed through a majority gate such that the first cache, the second cache, and the third cache receive a same value during the cache write when the triplicated circuit is configured to operate in the TMR mode of operation.

6. The triplicated circuit of claim 1 wherein the bus arbitration and control circuitry is configured to combine values from the first core logic, the second core logic, and the third core logic and automatically correct any mismatch, appearing as one core on a bus when the triplicated circuit is configured to operate in the TMR mode of operation.

7. The triplicated circuit of claim 1 wherein the bus arbitration and control circuitry is configured to arbitrate values from the first core logic, the second core logic, and the third core logic, appearing as three cores on a bus when the triplicated circuit is configured to operate in the multi-threaded mode of operation.

8. The triplicated circuit of claim 1 wherein the triplicated circuit is implemented in a Field Programmable Gate Array (FPGA).

9. A method of operating a triplicated circuit comprising a first core logic, a second core logic, a third core logic, a first memory associated with the first core logic, a second memory associated with the second core logic, a third memory associated with the third core logic, and bus arbitration and control circuitry, the method comprising:
  determining to operate in one of a Triple-Modular Redundancy (TMR) mode of operation and a multi-threaded mode of operation; and
  triplicating the first memory, the second memory, and the third memory via self-correcting flip-flops when the triplicated circuit is configured to operate in the TMR mode.

10. The method of claim 9 wherein triplicating the first memory, the second memory, and the third memory comprises the self-correcting flip-flops of the first memory, the second memory, and the third memory causing the first memory, the second memory, and the third memory to have a same retained value even if one has a different initial value.

11. The method of claim 9 wherein the triplicated circuit further comprises a first cache associated with the first core logic, a second cache associated with the second core logic, and a third cache associated with the third core logic; and
  the method further comprises passing a cache write by the first core logic, the second core logic, and the third core logic through a majority gate such that the first cache, the second cache, and the third cache receive a same value during the cache write when the triplicated circuit is configured to operate in the TMR mode of operation.

12. The method of claim 11 further comprising reading the values of the first cache, the second cache, and the third cache and writing the values back to the first cache, the second cache, and the third cache to ensure the first cache, the second cache, and the third cache contain the same value.

13. The method of claim 9 further comprising combining, by the bus arbitration and control circuitry, values from the first core logic, the second core logic, and the third core logic and automatically correcting any mismatch, appearing as one core on a bus when the triplicated circuit is configured to operate in the TMR mode of operation.

14. The method of claim 9 further comprising arbitrating, by the bus arbitration and control circuitry, values from the first core logic, the second core logic, and the third core logic, appearing as three cores on a bus when the triplicated circuit is configured to operate in the multi-threaded mode of operation.

15. The method of claim 9 wherein the triplicated circuit is implemented in a Field Programmable Gate Array (FPGA).

16. The method of claim 15 further comprising generating a first error signal when one stored value of the first core logic, the second core logic, and the third core logic mismatches.

17. The method of claim 16 further comprising generating a second error signal when one stored value of the first core logic, the second core logic, and the third core logic mismatches a number of times exceeding a threshold.

18. The method of claim 17 further comprising, in response to generating the second error signal, generating a FPGA configuration scrub for the first core logic, the second core logic, or the third core logic as indicated by the second error signal.

* * * * *